United States Patent
Yamamoto et al.

(10) Patent No.: US 9,384,682 B2
(45) Date of Patent: Jul. 5, 2016

(54) ELECTRONIC CIRCUIT, ELECTRONIC APPARATUS, AND AUTHENTICATION SYSTEM

(71) Applicant: FUJITSU LIMITED, Kawasaki-shi, Kanagawa (JP)

(72) Inventors: Dai Yamamoto, Kawasaki (JP); Masahiko Takenaka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 103 days.

(21) Appl. No.: 14/521,616

(22) Filed: Oct. 23, 2014

(65) Prior Publication Data
US 2015/0146869 A1 May 28, 2015

(30) Foreign Application Priority Data
Nov. 28, 2013 (JP) .................. 2013-246421

(51) Int. Cl.
*H04L 9/08* (2006.01)
*G09C 1/00* (2006.01)
*H03K 3/037* (2006.01)

(52) U.S. Cl.
CPC ............... *G09C 1/00* (2013.01); *H03K 3/0375* (2013.01); *H04L 9/0866* (2013.01)

(58) Field of Classification Search
None
See application file for complete search history.

(56) References Cited

U.S. PATENT DOCUMENTS

| | | | |
|---|---|---|---|
| 6,631,390 B1 | 10/2003 | Epstein | |
| 8,489,660 B2 * | 7/2013 | Herbert | G06F 7/588 380/240 |
| 2004/0017235 A1 * | 1/2004 | Hars | H03K 3/84 327/164 |
| 2004/0019617 A1 * | 1/2004 | Hars | H03K 3/84 708/250 |
| 2004/0061538 A1 | 4/2004 | Yasuda et al. | |
| 2008/0072188 A1 * | 3/2008 | Ja | G06F 17/5031 716/103 |
| 2009/0222502 A1 * | 9/2009 | Ikegami | G06F 7/588 708/251 |
| 2011/0299678 A1 * | 12/2011 | Deas | H04L 9/003 380/28 |
| 2013/0022197 A1 | 1/2013 | Yamamoto et al. | |
| 2013/0138710 A1 | 5/2013 | Yamamoto et al. | |

FOREIGN PATENT DOCUMENTS

| | | |
|---|---|---|
| JP | 2003-526151 | 9/2003 |
| JP | 2004-127283 | 4/2004 |
| JP | 2013-131867 | 7/2013 |
| WO | WO 01/67231 | 9/2001 |
| WO | WO 2011/117929 | 9/2011 |
| WO | WO 2012/001796 | 1/2012 |

* cited by examiner

*Primary Examiner* — Christopher Revak
(74) *Attorney, Agent, or Firm* — Staas & Halsey LLP

(57) ABSTRACT

An electronic circuit includes: a plurality of RS latch circuits each configured to enter a metastable state in accordance with a clock signal input to the RS latch circuit; a determination circuit configured to determine whether an output of each of the RS latch circuits is a random number or a fixed number; and a selector configured to select whether to maintain the clock signal input to the RS latch circuit, to change the clock signal input to the RS latch circuit to another clock signal having a different frequency, or to input a clock signal for fixing a signal output from the RS latch circuit, as the clock signal input to the RS latch circuit, in accordance with a result determined by the determination circuit.

12 Claims, 14 Drawing Sheets

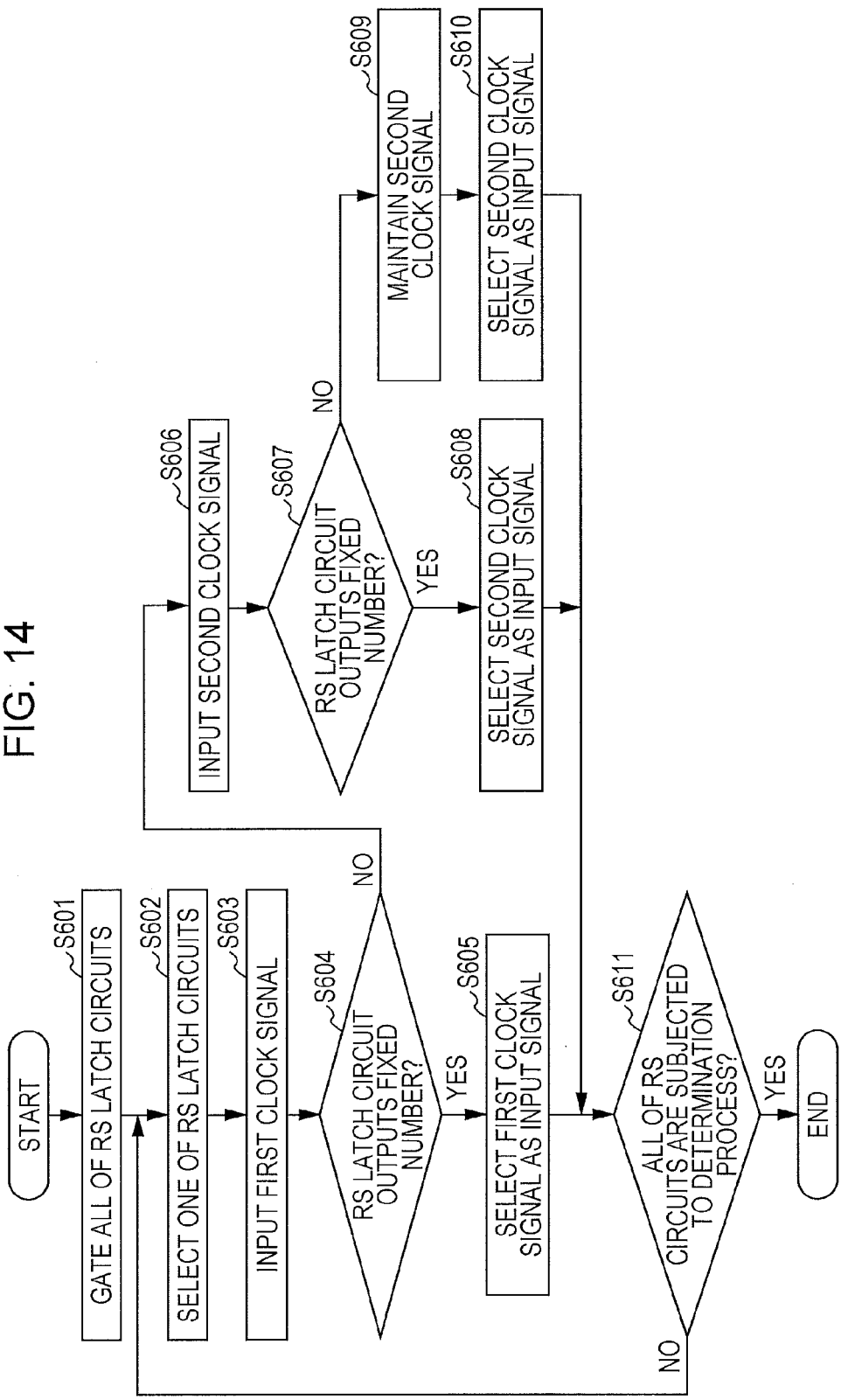

ELECTRONIC CIRCUIT, ELECTRONIC APPARATUS, AND AUTHENTICATION SYSTEM

CROSS-REFERENCE TO RELATED APPLICATION

This application is based upon and claims the benefit of priority of the prior Japanese Patent Application No. 2013-246421, filed on Nov. 28, 2013, the entire contents of which are incorporated herein by reference.

FIELD

The embodiments discussed herein are related to an electronic circuit, an electronic apparatus, and an authentication system.

BACKGROUND

With the evolution of the information society, services using an information network, such as an electronic payment network or a basic resident register network, have been in widespread use. To operate such services safely, information security technology has been used. The following two types of encryption method have been developed as encryption methods used as fundamental technology for information security: a public key cryptosystem and a common key cryptosystem. In the common key cryptosystem, the same private key is used for encryption and decryption. By using the private key as information that is secret from any third party other than the users, the security is ensured in the common key cryptosystem. In the public key cryptosystem, a public key that is used for encryption is made available to the public. In contrast, the private key used for decryption is used as information that is secret from any third party other than the users. In this manner, the security is ensured.

In both the public key cryptosystem and the common key cryptosystem, the security of the cryptosystem depends on security of the private key. If the private key is known to a third party, security of the cryptosystem is not ensured. To decrease the probability of a third party knowing the private key, a method for generating a private key using a random number has been developed.

Random numbers fall into the following two categories: a pseudo random number and a physical random number. A pseudo random number is a sequence of numbers generated through deterministic calculation. By performing calculation on an initial value (also referred to as a "seed") according to a predetermined algorithm, a pseudo random number is generated. A pseudo random number is easily cracked by an attacker if the pseudo random number algorithm and the initial value are available to the attacker. Accordingly, if a pseudo random number is used, there is a risk of the attacker guessing the private key. In contrast, a physical random number is generated using a random physical phenomenon, such as thermal noise output from an element that constitutes an electronic circuit. A physical random number is not reliable and, thus, is unpredictable. By generating a private key using a physical random number, security of the physical random number is increased. In addition, a physical random number generator using a meta table of an electronic circuit has been developed. The physical random number generator using a meta table of an electronic circuit is able to generate a physical random number that is hard to predict without a large circuit scale configuration.

In addition, end users of a service, such as the electronic payment network or the basic resident register network, may use a smart card. The smart card incorporates an IC chip, which stores a private key in a memory region of the IC chip. The IC chip incorporated into the smart card performs an encryption process, decryption process, a digital signature process, and a digital authentication process. When these processes are performed, a private key is used. The hardware resources of a compact device, such as smart card, are limited. In addition, electric power available for the compact device is limited. Accordingly, it is desirable that the compact devices have a random number generator that use much less power.

A random number generating method including a process for operating a flip-flop under a metastable condition and a process for generating a random bit based on the metastable condition has been developed. In addition, a random number generating circuit including a counter circuit that receives a clock signal and a random signal and outputs a count value of the clock signal in accordance with varying random signal and a latch circuit that latches the count value with varying random signal and outputs a random number signal has been developed.

Furthermore, a random number generator including a plurality of random number output circuits, an exclusive OR circuit, a random number determination circuit, and a random number generation instruction inhibiting unit has been developed. The exclusive OR circuit of the random number generator obtains an exclusive OR of the outputs of the plurality of random number output circuits. The random number determination circuit of the random number generator determines whether the output of each of the random number output circuits generated in response to a random number generation instruction is a random number. In addition, the random number generation instruction inhibiting unit of the random number generator inhibits a random number generation instruction from being sent to any one of the random number output circuits having the output determined not to be a random number by the random number determination circuit.

FIG. 1 is a circuit block diagram illustrating an example of an RS latch circuit used as a random number output circuit of a random number generator.

An RS latch circuit 10 includes a first NAND element 101, a second NAND element 102, an input terminal 103, and an output terminal 104. A first input terminal (0) of the first NAND element 101 and a second input terminal (1) of the second NAND element 102 are connected to the input terminal 103. A second input terminal (1) of the first NAND element 101 is connected to an output terminal of the second NAND element 102. A first input terminal (0) of the second NAND element 102 is connected to an output terminal of the first NAND element 101 and the output terminal 104.

When a signal of an L (Low) level is input to the input terminal 103 of the RS latch circuit 10, a signal output from the output terminal 104 has stably an H (High) level. If the signal input to the input terminal 103 of the RS latch circuit 10 is changed from the L level to an H level, the output signal of the first NAND element 101 and the output signal of the second NAND element 102 interfere with each other and, thus, the RS latch circuit 10 enters a "metastable state" in which the RS latch circuit 10 is unstable. After the RS latch circuit 10 enters a metastable state, the signal of the output terminal 104 becomes stable at either an L level or an H level. If the delay time of the first NAND element 101 is substantially the same as the delay time of the second NAND element 102, the probability of the signal output from the output terminal 104 having an L level is substantially the same as the probability of the signal output from the output terminal 104 having an H level. However, the driving capabilities and the widths of interconnection lines for connecting the terminals, for example, of the first NAND element 101 and the second NAND element 102 differ from each other. Accordingly, the signal level of the output terminal 104 after the RS latch circuit 10 enters a metastable state varies from RS latch circuit to RS latch circuit. For example, if the driving capabilities of the first NAND element 101 and the second NAND element 102 differ from each other, the signal of the output terminal 104 after the RS latch circuit 10 enters a metastable state is highly likely to be continuously output at either the L level or the H level. Alternatively, if the driving capabilities and the widths of interconnection lines for connecting the terminals of the first NAND element 101 and the second NAND element 102 are substantially the same, the signal level of the output terminal 104 after the RS latch circuit 10 enters a metastable state is uncertain.

When a clock signal alternately having an L level and an H level at predetermined intervals is input to the input terminal 103 of the RS latch circuit 10, the RS latch circuit 10 is classified into one of the following three types according to the output. That is, an RS latch circuit 10 of a first type changes the signal level of the output terminal 104 to either an L level or an H level in accordance with a rising edge of the clock signal. After entering a metastable state, the RS latch circuit 10 of a first type outputs a bit string including random L levels and H levels, that is, a random number. An RS latch circuit 10 of a second type maintains the signal level of the output terminal 104 at an L level after entering a metastable state. An RS latch circuit 10 of a third type maintains the signal level of the output terminal 104 at an H level after entering a metastable state. Since the RS latch circuits 10 of the second type and the third type continue to output signals of an H level and an L level, respectively, while the clock signal of an H level is being input, the RS latch circuits 10 do not function as random number output circuits. Hereinafter, if the signal level of the output terminal 104 of the RS latch circuit 10 becomes a fixed signal level (an L level or an H level) after the RS latch circuit 10 enters a metastable state, the following expression is used: "the RS latch circuit 10 outputs a fixed number." In addition, if the signal level of the output terminal 104 of the RS latch circuit 10 is capable of being either the L level or the H level after the RS latch circuit 10 enters a metastable state, the following expression is used: "the RS latch circuit 10 outputs a random number."

In addition, to avoid a clone product having the same or substantially the same features and functionality as a genuine product, an authentication feature may be added to a genuine product. To achieve the authentication feature to be added to a genuine product, a physically unclonable Function (PUF) has been developed. A latch PUF, which is one type of PUF, employs a circuit having the same configuration as the RS latch circuit 10 illustrated in FIG. 1 as a basic circuit configuration.

FIG. 2 is a circuit block diagram of the latch PUF.

A latch PUF 200 includes a plurality of RS latch circuits 10-1 to 10-N, each of which is the RS latch circuit 10 illustrated in FIG. 1. After a signal of an H level is input to the input terminal 103 and, thus, the latch PUF 200 enters a metastable state, the latch PUF 200 uses a fixed number output signal of an L level or an H level output from the output terminal 104 of the RS latch circuit 10 as individual-specific information. The reference numbers 103 and 104 are not illustrated in FIGS. 2 and 3. As an example, an individual-specific information generating unit (not illustrated) generates the individual-specific information by arranging the outputs of the RS latch circuits 10 each having a fixed output value based on the order information defined for each of the RS latch circuits 10.

In the example illustrated in FIG. 2, the RS latch circuits 10-1 and 10-N continue to output a signal of an L level after entering a metastable state throughout a predetermined clock period. Accordingly, the RS latch circuits 10-1 and 10-N are used as an individual-specific information generating circuit that generates a signal of an L level. In addition, the RS latch circuit 10-2 continues to output a signal of an H level after entering a metastable state throughout a predetermined clock period. Accordingly, the RS latch circuit 10-2 is used as an individual-specific information generating circuit that generates a signal of an H level. In contrast, each of the RS latch circuits 10-3 and 10-(N−1) outputs a signal of an L level and a signal of an H level (that is, a random number) throughout a predetermined clock period. If the RS latch circuits 10-3 and 10-(N−1) that output a random number are used as an individual-specific information generating circuit, the individual-specific information that is determined to be unique for each device varies. As a result, the reliability of the individual-specific information is lost. Since the reliability of the individual-specific information generated by the latch PUF 200 is lost, it is not desirable that the RS latch circuits 10-3 and 10-(N−1) be used as an individual-specific information generating circuit.

In addition, a latch PUF that uses an RS latch circuit that outputs a fixed number and an RS latch circuit that outputs a random number has been developed.

FIG. 3 is a circuit block diagram of a latch PUF that uses an RS latch circuit that outputs a fixed number and an RS latch circuit that outputs a random number.

A latch PUF 300 includes RS latch circuits 10-1 to 10-6, each of which is the RS latch circuit 10 illustrated in FIG. 1, and a determination circuits 301-1 to 301-6, each of which is a determination circuit 301. The determination circuits 301-1 to 301-6 determine the types of the output signals of RS latch circuits 10-1 to 10-6, respectively. Input terminals 103 of the RS latch circuits 10-1 to 10-6 receive clock signals having the same cycle. When the clock signal is input, the determination circuit 301 monitors the output signal throughout a predetermined clock period after the RS latch circuit 10 enters a metastable state. If the signal level of the output signal of the RS latch circuit 10 after the RS latch circuit 10 enters a metastable state is an L level throughout the monitored predetermined clock period, the determination circuit 301 outputs two signals of an L level, that is, "00". In contrast, if the signal level of the output signal of the RS latch circuit 10 after the RS latch circuit 10 enters a metastable state is an H level throughout the monitored predetermined clock period, the determination circuit 301 outputs two signals of an H level, that is, "11". When a random number is generated during the monitored predetermined clock period and if there are many signals of an L level in the generated random number, the determination circuit 301 outputs a signal of an L level and a signal of an H level, that is, "01". When a random number is generated during the monitored predetermined clock period and if there are many signals of an H level in the generated random number, the determination circuit 301 outputs a signal of an H level and a signal of an L level, that is, "10". The latch PUF 300 generates individual-specific information using an RS latch circuit that outputs a fixed number and an RS latch circuit that outputs a random number. As illustrated in FIG. 3, the latch PUF 300 generates an ID [11:0] including a signal string "001011011100" using the outputs of the RS latch circuits 10-1 to 10-6.

The above technologies are described in International Publication Pamphlet No. WO 2011/117929, Japanese National Publication of International Patent Application No. 2003-526151, Japanese Laid-open Patent Publication No. 2004-127283, International Publication Pamphlet No. WO 2012/001796, and Japanese Laid-open Patent Publication No. 2013-131867.

SUMMARY

According to an aspect of the invention, an electronic circuit includes: a plurality of RS latch circuits each configured to enter a metastable state in accordance with a clock signal input to the RS latch circuit; a determination circuit configured to determine whether an output of each of the RS latch circuits is a random number or a fixed number; and a selector configured to select whether to maintain the clock signal input to the RS latch circuit, to change the clock signal input to the RS latch circuit to another clock signal having a different frequency, or to input a clock signal for fixing a signal output from the RS latch circuit, as the clock signal input to the RS latch circuit, in accordance with a result determined by the determination circuit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 14 is a flowchart of another example of the process performed by the latch PUF illustrated in FIG. 8.

DESCRIPTION OF EMBODIMENTS

Figure 1:
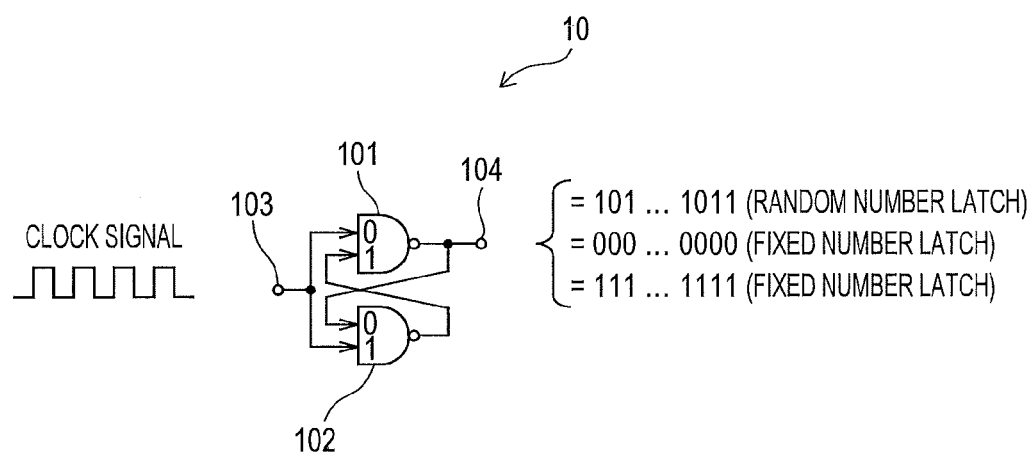
FIG. 1 is a circuit block diagram illustrating an example of an RS latch circuit.
Figure 2:
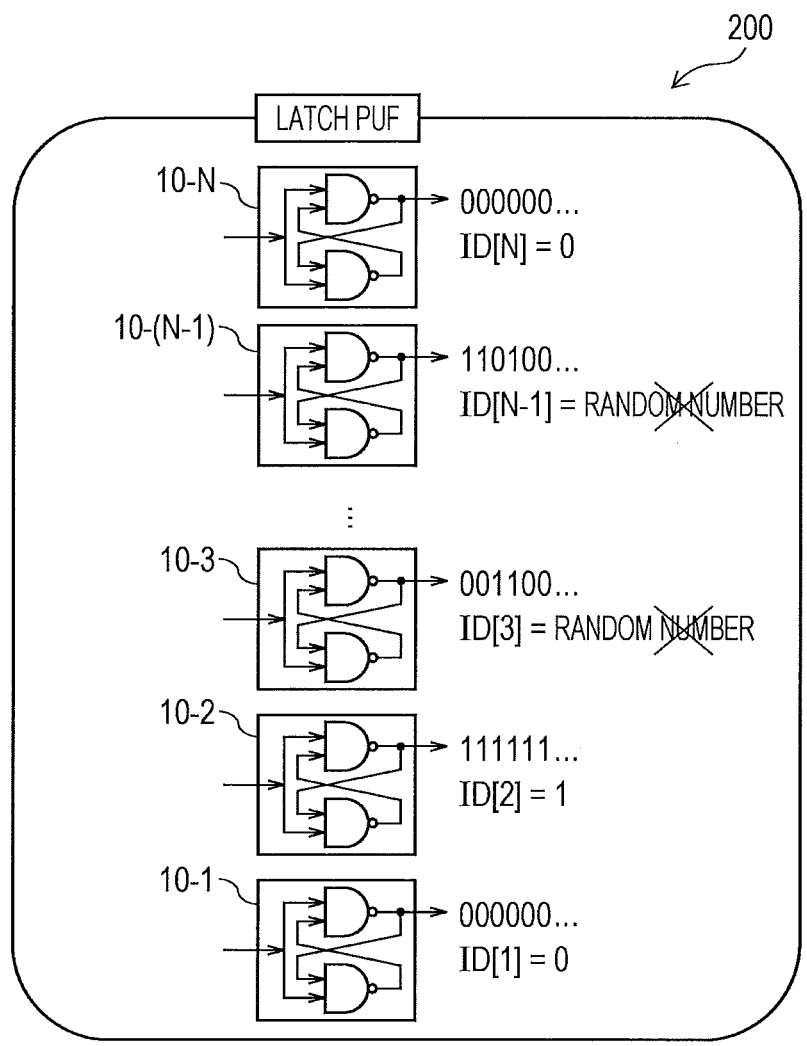
FIG. 2 is a circuit block diagram of an example of an existing latch PUF.

In a random number generator using an RS latch circuit, the ratio of the number of RS latch circuits that output a random number to the total number of RS latch circuits is low. Accordingly, the quality (entropy) of the random number is decreased. By increasing the number of implemented RS latch circuits, the quality of the random number may be increased. However, if the number of the RS latch circuits is increased, the circuit scale of the random number generator including the RS latch circuits is increased. Accordingly, it is not desirable to increase the number of the RS latch circuits.

In addition, in a latch PUF that uses a fixed number output from the RS latch circuit as individual-specific information, the RS latch circuit that outputs a random number is not used as individual-specific information since the random number is not reliable, which is problematic. In addition, even when, like the latch PUF 300, an RS latch circuit that outputs a random number is used in a latch PUF, the difference between the number of the RS latch circuits that output a random number and the number of the RS latch circuits that output a fixed number may be large and, thus, the quality of the generated individual-specific information may be decreased.

A technology capable of changing the ratio of the number of RS latch circuits that output a random number or a fixed number to the total number of RS latch circuits is described below with reference to the accompanying drawings. Note that the scope of the present disclosure is not limited by the disclosure of the following embodiments.

Issues of existing random number generators and latch PUFs are described in more detail first.

Random number generators that use an RS latch circuit have the following two issues. That is, the first issue is that the power consumption of the random number generator increases since a clock signal is continuously input to the input terminals of the RS latch circuits regardless of whether the RS latch circuits are outputting a random number. The second issue is that the ratio of the number of the RS latch circuits that output a random number to the total number of the RS latch circuits is low.

The first issue may be solved by stopping sending a random number generation instruction to an RS latch for which the random number determination circuit determines that the output of the RS latch circuit generated in response to the random number generation instruction is not a random number among a plurality of the RS latch circuits. In contrast, the second issue has not yet been solved.

The second issue is described in more detail below. In an experiment conducted by the present inventors, among 64 RS latch circuits mounted in a field-programmable gate array (FPGA), only 4 RS latch circuits generated a random number. That is, the ratio of the RS latch circuits that output a random number to the total number of the RS latch circuits was about $1/16$. The rest of the RS latch circuits (about $15/16$ of the all RS latch circuits) output a fixed number, not a random number. If the number of the mounted RS latch circuits is small, the quality of the generated random number is likely to be decreased. If a large number of the RS latch circuits are mounted in order to ensure the quality of the random number, the circuit scale of the random number generator increases. To ensure the quality of the random number without increasing the circuit scale, the ratio of the number of the RS latch circuits that output a random number to the total number of the RS latch circuits may be increased. However, it is not easy to increase the number of the RS latch circuits that output a random number after the RS latch circuits are mounted in a semiconductor device. This is because the ratio of the number of the RS latch circuits that output a random number to the total number of the RS latch circuits is determined in accordance with, for example, the type of semiconductor device having the RS latch circuits mounted therein, a physical property, such as a process, and the environmental factors when the semiconductor device is manufactured.

In addition, when an RS latch circuit is used in a latch PUF, the output of the RS latch circuit that outputs a random number is not reliable. Accordingly, it is difficult to use the output as the individual-specific information. Thus, the RS latch circuit that outputs a random number is an unnecessary circuit in the latch PUF.

Furthermore, if an RS latch circuit that outputs a random number is used in a latch PUF, the difference between the number of the RS latch circuits that output a random number and the number of the RS latch circuits that output a fixed number increases and, thus, the quality of the generated individual-specific information may decrease.

According to a first embodiment, to increase the quality of a random number generated by a random number generator having an RS latch circuit mounted therein, the ratio of the number of the RS latch circuits that output a random number to the total number of the RS latch circuits is increased. According to a second embodiment, to increase the number of patterns of the individual-specific information generated by the latch PUF having an RS latch circuit mounted therein, the ratio of the number of the RS latch circuits that output a fixed number to the total number of the RS latch circuits is increased. According to a third embodiment, to increase the quality of the individual-specific information generated by the latch PUF having an RS latch circuit that outputs a random number, the ratio of the number of the RS latch circuits that output a random number to the total number of the RS latch circuits or the ratio of the number of the RS latch circuits that output a fixed number to the total number of the RS latch circuits is increased.

Through research and experimentation, the present inventors have discovered that the ratio of the number of the RS latch circuits that output a random number or the ratio of the number of the RS latch circuits that output a fixed number to the total number of the RS latch circuits varies by varying the frequency of the clock signal input to the input terminals of the RS latch circuits. According to the present embodiments, by using the discovered knowledge, an electronic circuit, an electronic apparatus, and an authentication system that are capable of being used as a random number generator or a latch PUF are provided.

First Embodiment

Figure 4:
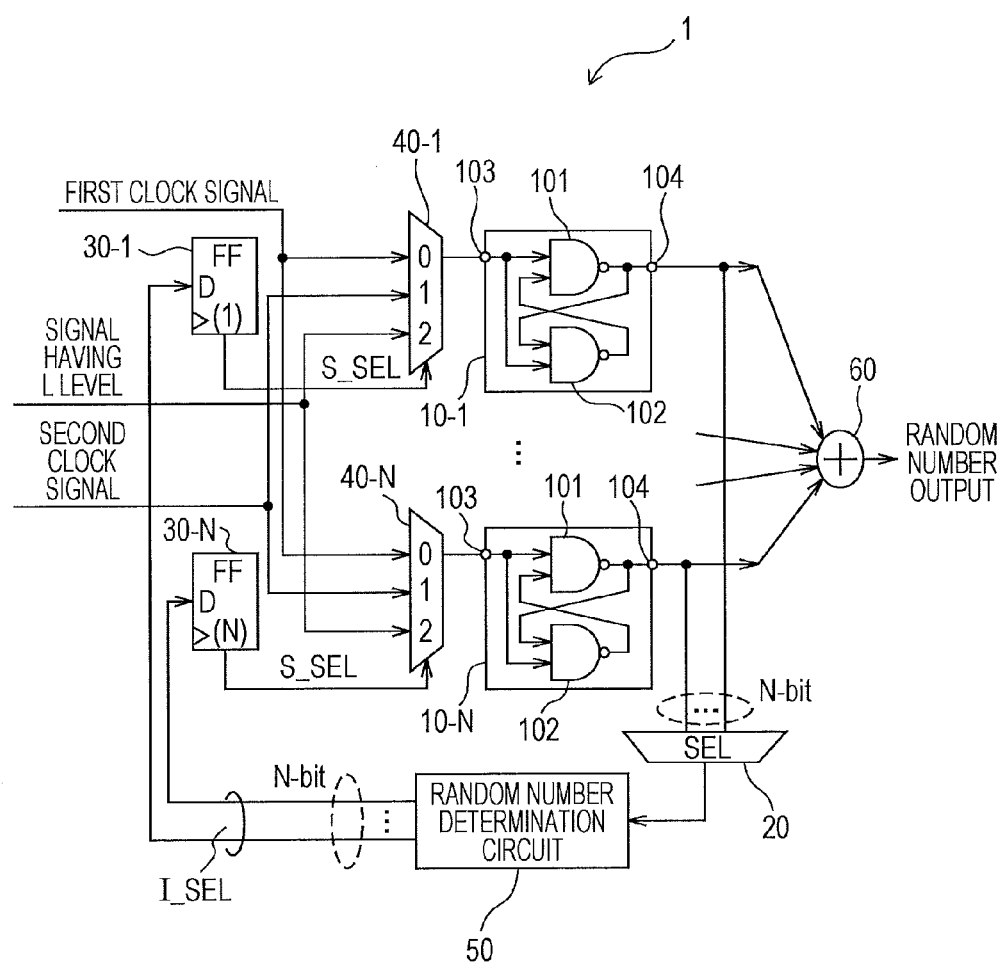
FIG. 4 is a circuit block diagram of an electronic circuit according to a first embodiment.

FIG. 4 is a circuit block diagram of a random number generator serving as an electronic circuit according to the first embodiment.

A random number generator 1 includes a plurality of RS latch circuits 10-1 to 10-N (collectively referred to as an "RS latch circuit 10"), an output selector 20, a plurality of flip-flops 30-1 to 30-N (collectively referred to as a "flip-flop 30"), a plurality of selectors 40-1 to 40-N (collectively referred to as a "selector 40"), a random number determination circuit 50, and an exclusive OR circuit 60.

The RS latch circuit 10 includes a first NAND element 101, a second NAND element 102, an input terminal 103, and an output terminal 104. Since the operations performed by the RS latch circuits 10-1 to 10-N have already been described with reference to the RS latch circuit 10 illustrated in FIG. 1, description of the operations is not repeated.

The output selector 20 selects one of the output signals output from the output terminals 104 of the RS latch circuits 10-1 to 10-N in accordance with an output selection instruction corresponding to an output selection instruction signal O_SEL (not illustrated) output from the random number determination circuit 50. Thereafter, the output selector 20 sends the selected signal to the random number determination circuit 50.

The flip-flops 30-1 to 30-N send input selection instruction signals S_SEL indicating selected input signals to the selectors 40-1 to 40-N, respectively, in accordance with an input selection instruction corresponding to an input selection instruction signal I_SEL sent from the random number determination circuit 50. That is, the flip-flop 30-1 sends one of the input selection instruction signals S_SEL to the selector 40-1, the flip-flop 30-2 sends one of the input selection instruction signals S_SEL to the selector 40-2, and the flip-flop 30-N sends one of the input selection instruction signals S_SEL to the selector 40-N.

The selector 40 selects one of input signals input to the RS latch circuit 10 in accordance with a selection instruction corresponding to the input selection instruction signal S_SEL sent from the flip-flop 30. A first signal input terminal (0) of the selector 40 receives a first clock signal. A second signal input terminal (1) of the selector 40 receives a second clock signal having a frequency that is lower than the first clock signal. A third signal input terminal (2) of the selector 40 receives a signal having an L level. If the selector 40 selects the first clock signal input to the first signal input terminal (0), the first clock signal is input to the input terminal 103 of the RS latch circuit 10. If the selector 40 selects the second clock signal input to the second signal input terminal (1), the second clock signal is input to the input terminal 103 of the RS latch circuit 10. If the selector 40 selects the signal having an L level input to the third signal input terminal (2), a signal having an L level is input to the input terminal 103 of the RS latch circuit 10. The output signal output from the RS latch circuit 10 is fixed to an H level, and the RS latch circuit 10 is gated.

The random number determination circuit 50 controls the RS latch circuit 10 via the flip-flop 30 and the selector 40 based on the output signal output from the RS latch circuit 10. More specifically, if the first clock signal is input to the RS latch circuit 10, the random number determination circuit 50 determines whether the RS latch circuit 10 to which the first clock signal is input outputs a random number or a fixed number. If it is determined that the RS latch circuit 10 to which the first clock signal is input outputs a random number, the random number determination circuit 50 selects the first clock signal as the input signal to be input to the RS latch circuit 10. However, if it is determined that the RS latch circuit 10 to which the first clock signal is input outputs a fixed number, the random number determination circuit 50 changes a signal input to the RS latch circuit 10 from the first clock signal to the second clock signal. If it is determined that the RS latch circuit 10 to which the second clock signal is input outputs a random number, the random number determination circuit 50 selects the second clock signal as the input signal to be input to the RS latch circuit 10. When either the first clock signal or the second clock signal is input to the RS latch circuit 10 and if it is determined that the RS latch circuit 10 outputs a fixed number, the random number determination circuit 50 selects the signal having an L level as the input signal to be input to the RS latch circuit 10. If the signal having an L level is input to the RS latch circuit 10, the RS latch circuit 10 is gated. The random number determination circuit 50 operates in synchronization with the second clock signal having a lower frequency.

The exclusive OR circuit 60 calculates and outputs the exclusive OR of the outputs of the RS latch circuits 10-1 to 10-N.

Figure 5:
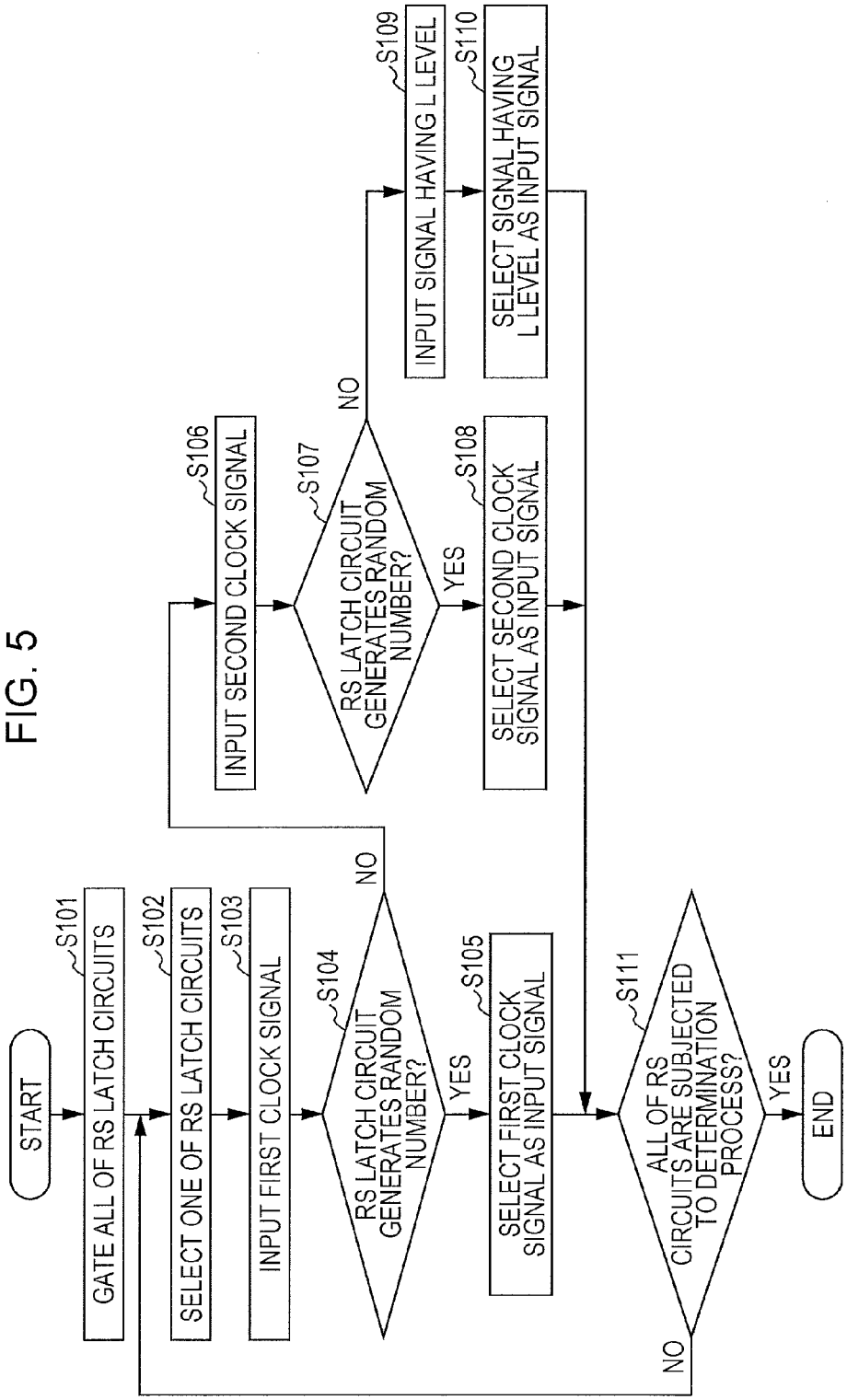
FIG. 5 is a flowchart of the processing performed by a random number determination circuit illustrated in FIG. 4.

FIG. 5 is a flowchart of the processing performed by the random number determination circuit 50.

In operation S101, the random number determination circuit 50 sends instructions to the flip-flops 30-1 to 30-N so that each of the selectors 40-1 to 40-N selects a signal having an L level input to the third signal input terminal (2) first. If the selectors 40-1 to 40-N select the signals having an L level input to the third signal input terminals (2), the output signals output from the RS latch circuits 10-1 to 10-N are all fixed to an H level and, thus, the RS latch circuits 10-1 to 10-N are gated.

Subsequently, in operation S102, the random number determination circuit 50 sends, to the output selector 20, the output selection instruction signal O_SEL (not illustrated) indicating that the RS latch circuit 10-1 is to be selected. Upon receiving the output selection instruction signal O_SEL, the output selector 20 selects the output signal output from the RS latch circuit 10-1.

Subsequently, in operation S103, the random number determination circuit 50 sends, to the flip-flop 30-1, the input selection instruction signal I_SEL instructing the selector 40-1 to select the first clock signal input to the first signal input terminal (0). Upon receiving the input selection instruction signal I_SEL, the flip-flop 30-1 sends a corresponding selection instruction signal S_SEL to the selector 40-1. Upon receiving the selection instruction signal S_SEL, the selector 40-1 selects the first clock signal input to the first signal input terminal (0) as an input signal to be input to the RS latch circuit 10-1.

Subsequently, in operation S104, when the first clock signal is input to the input terminal 103 of the RS latch circuit 10-1, the random number determination circuit 50 monitors the output signal of the RS latch circuit 10-1 during predetermined clock periods after the RS latch circuit 10-1 enters the metastable state. The random number determination circuit 50 determines whether the signal level of the output signal of the RS latch circuit 10-1 varies or remains unchanged during the monitored predetermined clock periods. If the signal level of the output signal of the RS latch circuit 10-1 varies during the monitored predetermined clock periods, the random number determination circuit 50 determines that the RS latch circuit 10-1 outputs a random number. However, if the signal level of the output signal of the RS latch circuit 10-1 remains unchanged during the monitored predetermined clock periods, the random number determination circuit 50 determines that the RS latch circuit 10-1 outputs a fixed number. If the random number determination circuit 50 determines that the signal level of the output signal of the RS latch circuit 10-1 varies during the monitored predetermined clock periods, the processing proceeds to operation S105. However, if the random number determination circuit 50 determines that the signal level of the output signal of the RS latch circuit 10-1 remains unchanged during the monitored predetermined clock periods, the processing proceeds to operation S106.

When the processing proceeds to operation S105, the random number determination circuit 50 selects the first clock signal as the input signal to be input to the RS latch circuit 10-1. Subsequently, the processing proceeds to operation S111.

When the processing proceeds to operation S106, the random number determination circuit 50 sends, to the flip-flop 30-1, the input selection instruction signal I_SEL instructing the selector 40-1 to select the second clock signal input to the second signal input terminal (1). Upon receiving the input selection instruction signal I_SEL, the flip-flop 30-1 sends a corresponding selection instruction signal S_SEL to the selector 40-1. Upon receiving the selection instruction signal S_SEL, the selector 40-1 selects the second clock signal input to the second signal input terminal (1) as the input signal to be input to the RS latch circuit 10-1.

Subsequently, in operation S107, when the second clock signal is input to the input terminal 103 of the RS latch circuit 10-1, the random number determination circuit 50 monitors the output signal of the RS latch circuit 10-1 during predetermined clock periods after the RS latch circuit 10-1 enters the metastable state. If the random number determination circuit 50 determines that the signal level of the output signal of the RS latch circuit 10-1 varies during the monitored predetermined clock periods, the processing proceeds to operation S108. However, if the random number determination circuit 50 determines that the signal level of the output signal of the RS latch circuit 10-1 remains unchanged during the monitored predetermined clock periods, the processing proceeds to operation S109.

If the processing proceeds to operation S108, the random number determination circuit 50 selects the second clock signal as the input signal to be input to the RS latch circuit 10-1. Thereafter, the processing proceeds to operation S111.

If the processing proceeds to operation S109, the random number determination circuit 50 sends, to the flip-flop 30-1, the input selection instruction signal I_SEL instructing the selector 40-1 to select the signal having an L level input to the third signal input terminal (2). Upon receiving the input selection instruction signal I_SEL, the flip-flop 30-1 sends a corresponding selection instruction signal S_SEL to the selector 40-1. Upon receiving the selection instruction signal S_SEL, the selector 40-1 selects the signal having an L level input to the third signal input terminal (2) as the input signal to be input to the RS latch circuit 10-1.

Subsequently, in operation S110, the random number determination circuit 50 selects the signal having an L level as the input signal to be input to the RS latch circuit 10-1. Thereafter, the processing proceeds to operation S111.

If the processing proceeds to operation S111, the random number determination circuit 50 determines whether the determination process has been performed on all of the RS latch circuits 10-1 to 10-N. If the random number determination circuit 50 determines that the determination process has yet not been performed on all of the RS latch circuits 10-1 to 10-N, the processing returns to operation S102. However, if the random number determination circuit 50 determines that the determination process has already been performed on all of the RS latch circuits 10-1 to 10-N, the processing is completed. In this case, since the random number determination circuit 50 has performed the determination process on only the RS latch circuit 10-1, the processing returns to operation S102, where the processes from operations S102 to S110 are performed for the RS latch circuit 10-2. Thereafter, after operations S102 to S110 are sequentially performed for the RS latch circuits 10-2 to 10-N, the processing is completed.

Second Embodiment

Figure 6:
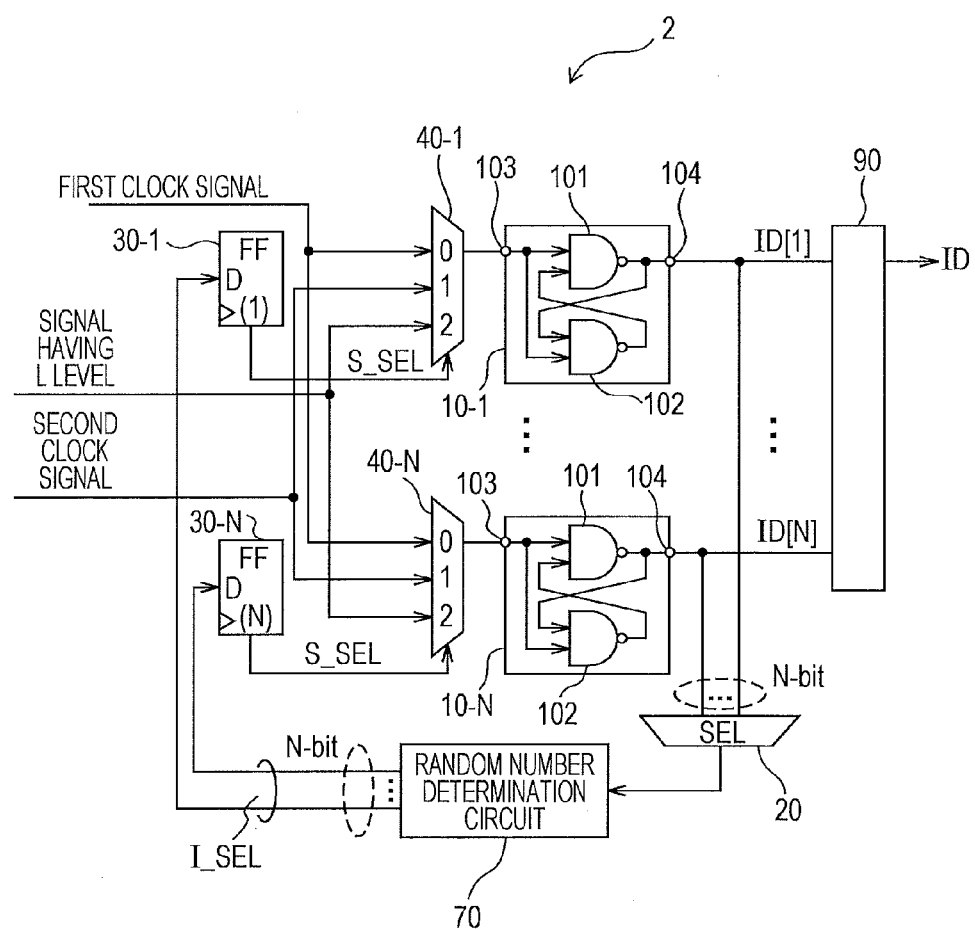
FIG. 6 is a circuit block diagram of an electronic circuit according to a second embodiment.

FIG. 6 is a circuit block diagram of the latch PUF serving as an electronic circuit according to a second embodiment.

A latch PUF 2 includes a plurality of RS latch circuits 10-1 to 10-N (also collectively referred to as an "RS latch circuit 10"), an output selector 20, a plurality of flip-flops 30-1 to 30-N (also collectively referred to as a "flip-flop 30"), a plurality of selectors 40-1 to 40-N (also collectively referred to as a "selector 40"), a random number determination circuit 70, and an individual-specific information generator 90. The latch PUF 2 differs from the random number generator 1 in that the latch PUF 2 includes the random number determination circuit 70 instead of the random number determination circuit 50. In addition, the latch PUF 2 differs from the random number generator 1 in that the latch PUF 2 does not include the exclusive OR circuit 60 and includes the individual-specific information generator 90.

The random number determination circuit 70 controls the RS latch circuit 10 via the flip-flop 30 and the selector 40 based on an output signal output from the RS latch circuit 10. More specifically, if the first clock signal is input to the RS latch circuit 10, the random number determination circuit 70 determines whether the RS latch circuit 10 to which the first clock signal is input outputs a random number or a fixed number. If it is determined that the RS latch circuit 10 to which the first clock signal is input outputs a fixed number, the random number determination circuit 70 selects the first clock signal as the input signal to be input to the RS latch circuit 10. However, if it is determined that the RS latch circuit 10 to which the first clock signal is input outputs a random number, the random number determination circuit 70 changes the signal input to the RS latch circuit 10 from the first clock signal to the second clock signal having a frequency that is lower than the first clock signal. If it is determined that the RS latch circuit 10 to which the second clock signal is input outputs a fixed number, the random number determination circuit 70 selects the second clock signal as the input signal to be input to the RS latch circuit 10. When either the first clock signal or the second clock signal is input to the RS latch circuit 10 and if it is determined that the RS latch circuit 10 outputs a random number, the random number determination circuit 70 selects the signal having an L level as the input signal to be input to the RS latch circuit 10. If the signal having an L level is input to the RS latch circuit 10, the RS latch circuit 10 is gated. The random number determination circuit 70 operates in synchronization with the second clock signal having a lower frequency.

The individual-specific information generator 90 arranges the outputs of the RS latch circuits 10-1 to 10-N based on the order information defined in each of the RS latch circuits 10-1 to 10-N and generates the individual-specific information.

Figure 7:
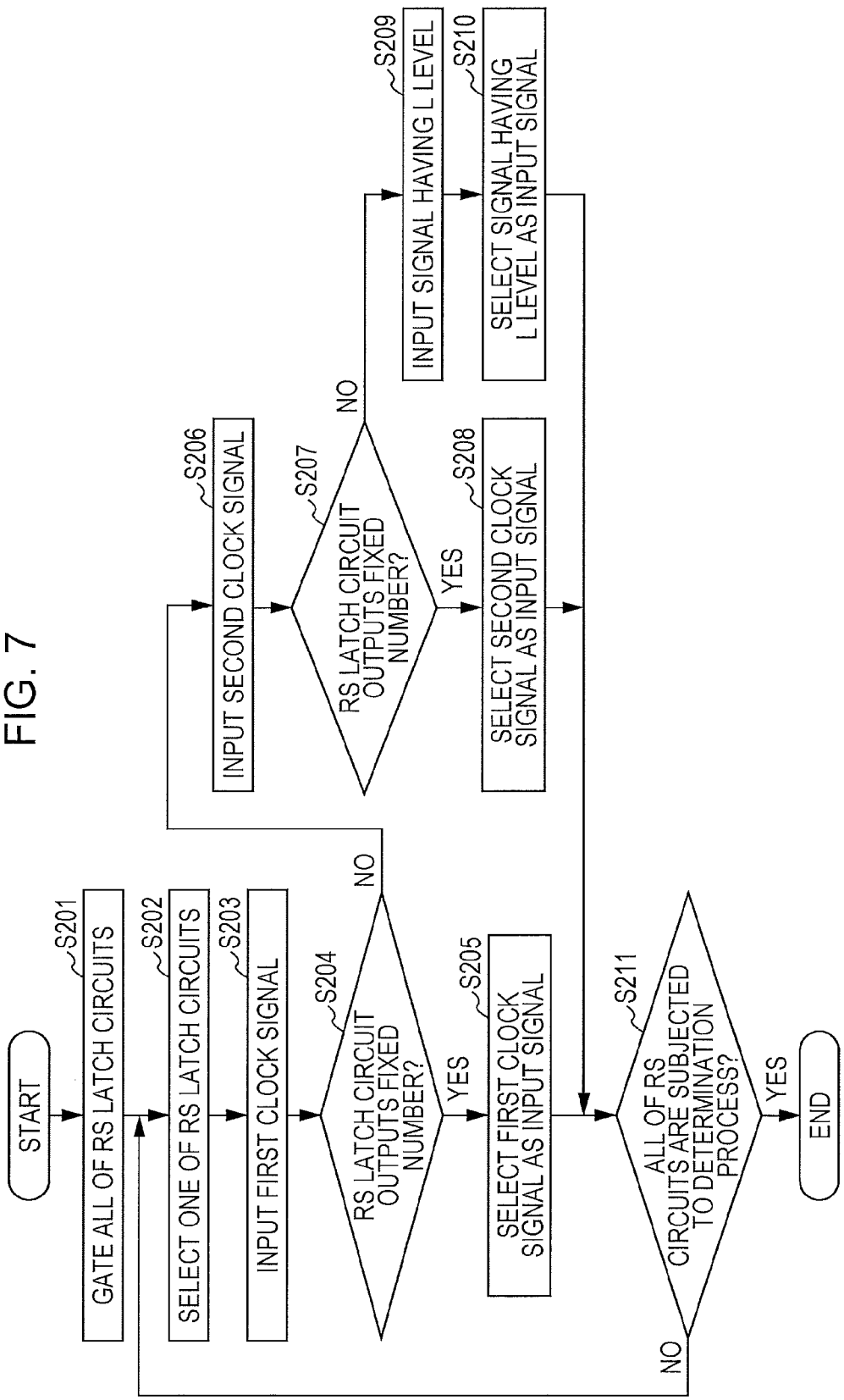
FIG. 7 is a flowchart of the processing performed by a latch PUF illustrated in FIG. 6.

FIG. 7 is a flowchart of the processing performed by the random number determination circuit 70.

In operations S201 to S203, the random number determination circuit 70 performs processes that are similar to those in operations S101 to S103 performed by the random number determination circuit 50, respectively.

Subsequently, in operation S204, when the first clock signal is input to the input terminal 103 of the RS latch circuit 10-1, the random number determination circuit 70 monitors the output signal of the RS latch circuit 10-1 during predetermined clock periods after the RS latch circuit 10-1 enters the metastable state. The random number determination circuit 70 determines whether the signal level of the output signal of the RS latch circuit 10-1 varies or remains unchanged during the monitored predetermined clock periods. If the signal level of the output signal of the RS latch circuit 10-1 remains unchanged during the monitored predetermined clock periods, the random number determination circuit 70 determines that the RS latch circuit 10-1 outputs a fixed number. However, if the signal level of the output signal of the RS latch circuit 10-1 varies during the monitored predetermined clock periods, the random number determination circuit 70 determines that the RS latch circuit 10-1 outputs a random number. If the random number determination circuit 70 determines that the signal level of the output signal of the RS latch circuit 10-1 remains unchanged during the monitored predetermined clock periods, the processing proceeds to operation S205. However, if the random number determination circuit 70 determines that the signal level of the output signal of the RS latch circuit 10-1 varies during the monitored predetermined clock periods, the processing proceeds to operation S206.

When the processing proceeds to operation S205, the random number determination circuit 70 selects the first clock signal as the input signal to be input to the RS latch circuit 10-1. Subsequently, the processing proceeds to operation S211.

When the processing proceeds to operation S206, the random number determination circuit 70 sends, to the flip-flop 30-1, an input selection instruction signal I_SEL instructing the selector 40-1 to select the second clock signal input to the second signal input terminal (1). Upon receiving the input selection instruction signal I_SEL, the flip-flop 30-1 sends a corresponding selection instruction signal S_SEL to the selector 40-1. Upon receiving the selection instruction signal S_SEL, the selector 40-1 selects the second clock signal input to the second signal input terminal (1) as the input signal to be input to the RS latch circuit 10-1.

Subsequently, in operation S207, when the second clock signal is input to the input terminal 103 of the RS latch circuit 10-1, the random number determination circuit 70 monitors the output signal of the RS latch circuit 10-1 during predetermined clock periods after the RS latch circuit 10-1 enters the metastable state. If the random number determination circuit 70 determines that the signal level of the output signal of the RS latch circuit 10-1 remains unchanged during the monitored predetermined clock periods, the processing proceeds to operation S208. However, if the random number determination circuit 70 determines that the signal level of the output signal of the RS latch circuit 10-1 varies during the monitored predetermined clock periods, the processing proceeds to operation S209.

If the processing proceeds to operation S208, the random number determination circuit 70 selects the second clock signal as the input signal to be input to the RS latch circuit 10-1. Subsequently, the processing proceeds to operation S211.

When the processing proceeds to operation S209, the random number determination circuit 70 sends, to the flip-flop 30-1, the input selection instruction signal I_SEL instructing the selector 40-1 to select the signal having an L level input to the third signal input terminal (2). Upon receiving the input selection instruction signal I_SEL, the flip-flop 30-1 sends a corresponding selection instruction signal S_SEL to the selector 40-1. Upon receiving the selection instruction signal S_SEL, the selector 40-1 selects the signal having an L level input to the third signal input terminal (2) as the input signal to be input to the RS latch circuit 10-1.

Subsequently, in operation S210, the random number determination circuit 70 selects the signal having an L level as the input signal to be input to the RS latch circuit 10-1. Thereafter, the processing proceeds to operation S211.

If the processing proceeds to operation S211, the random number determination circuit 70 determines whether the determination process has been performed on all of the RS latch circuits 10-1 to 10-N. If the random number determination circuit 70 determines that the determination process has yet not been performed on all of the RS latch circuits 10-1 to 10-N, the processing returns to operation S202. However, if the random number determination circuit 70 determines that the determination process has already been performed on all of the RS latch circuits 10-1 to 10-N, the processing is completed. In this case, since the random number determination circuit 70 has performed the determination process on only the RS latch circuit 10-1, the processing returns to operation S202, where the processes from operations S202 to S210 are performed for the RS latch circuit 10-2. Thereafter, after operations S202 to S210 are sequentially performed for the RS latch circuits 10-2 to 10-N, the processing is completed.

When the processing performed by the random number determination circuit 70 is completed, the individual-specific information generator 90 acquires the outputs of the RS latch circuits 10-1 to 10-N. The individual-specific information generator 90 arranges the outputs of the RS latch circuits other than the RS latch circuits that are gated based on the order information defined in each of the RS latch circuits 10 and generates the individual-specific information.

Third Embodiment

Figure 8:
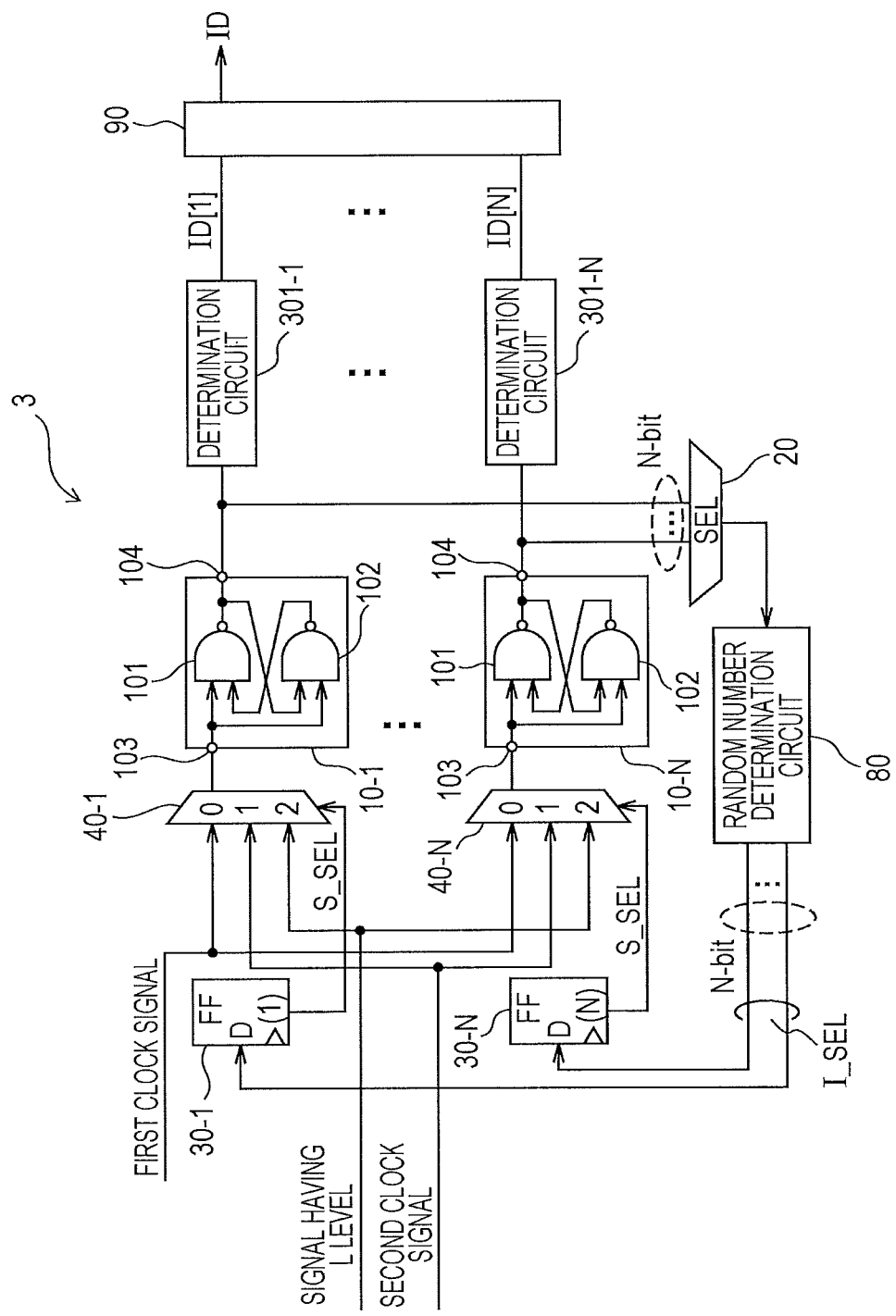
FIG. 8 is a circuit block diagram of an electronic circuit according to a third embodiment.

FIG. 8 is a circuit block diagram of the latch PUF serving as the electronic circuit according to a third embodiment.

A latch PUF 3 includes a plurality of RS latch circuits 10-1 to 10-N (also collectively referred to as an "RS latch circuit 10"), an output selector 20, a plurality of flip-flops 30-1 to 30-N (also collectively referred to as a "flip-flop 30"), a plurality of selectors 40-1 to 40-N (also collectively referred to as a "selector 40"), a random number determination circuit 80, and an individual-specific information generator 90. The latch PUF 3 further includes determination circuits 301-1 to 301-N (also collectively referred to as a "determination circuit 301"). The latch PUF 3 differs from the latch PUF 2 illustrated in FIG. 6 in that the latch PUF 3 includes the random number determination circuit 80 instead of the random number determination circuit 70. In addition, the latch PUF 3 differs from the latch PUF 2 in that the latch PUF 3 includes the determination circuits 301-1 to 301-N.

The random number determination circuit 80 controls the RS latch circuit 10 via the flip-flop 30 and the selector 40 based on the output signal output from the RS latch circuit 10. More specifically, if the first clock signal is input to the RS latch circuit 10, the random number determination circuit 80 determines whether the RS latch circuit 10 to which the first clock signal is input outputs a random number or a fixed number. If it is determined that the RS latch circuit 10 to which the first clock signal is input outputs a random number, the random number determination circuit 80 selects the first clock signal as the input signal to be input to the RS latch circuit 10. However, if it is determined that the RS latch circuit 10 to which the first clock signal is input outputs a fixed number, the random number determination circuit 80 changes the signal input to the RS latch circuit 10 to the second clock signal having a frequency lower than the first clock signal. If the RS latch circuit 10 to which the second clock signal is input outputs a random number, the random number determination circuit 80 selects the second clock signal as the input signal to be input to the RS latch circuit 10. When either the first clock signal or the second clock signal is input to the RS latch circuit 10 and if it is determined that the RS latch circuit 10 outputs a fixed number, the random number determination circuit 80 selects the second clock signal as the input signal to be input to the RS latch circuit 10. The random number determination circuit 80 operates in synchronization with the second clock signal having a lower frequency.

Figure 3:
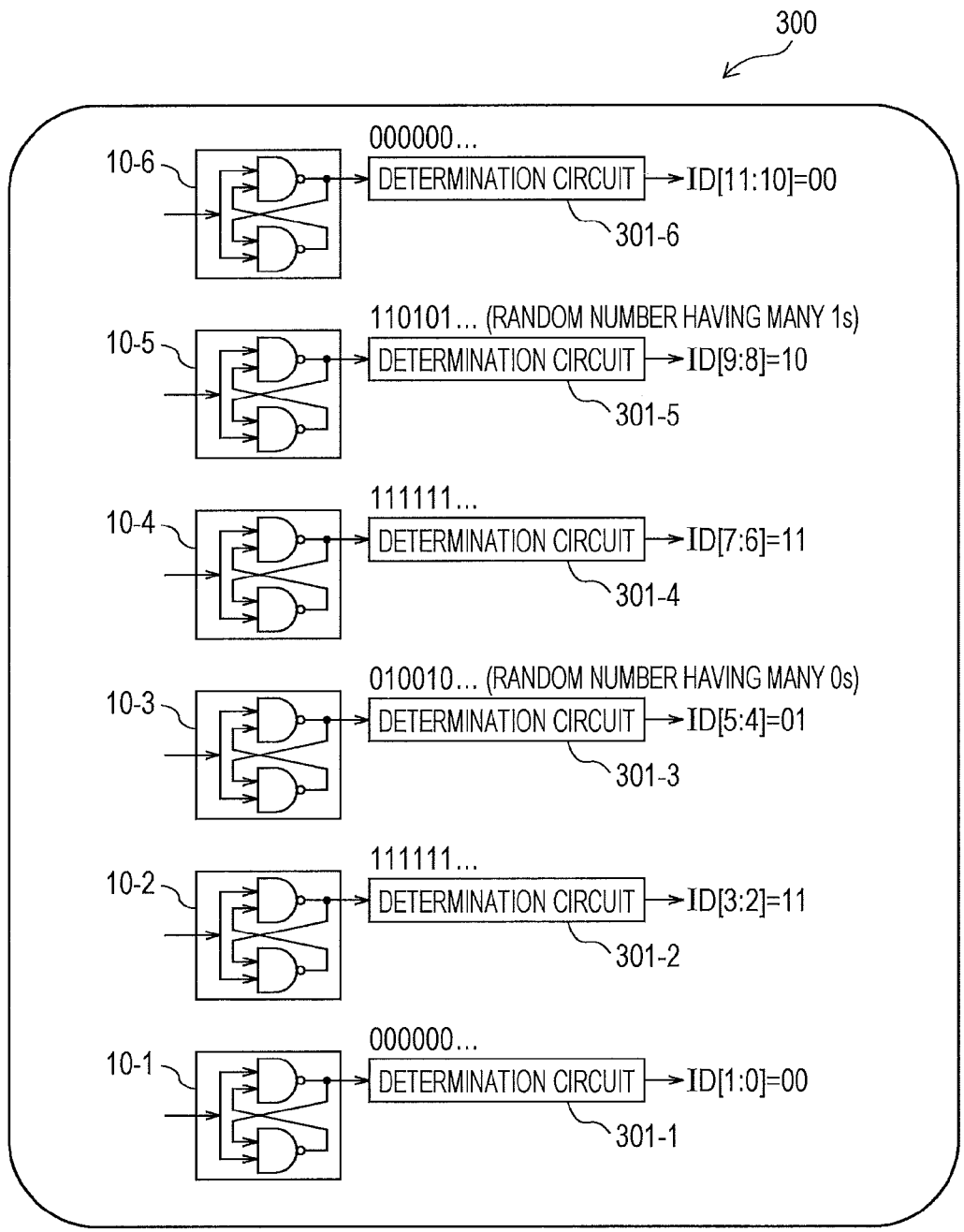
FIG. 3 is a circuit block diagram of another example of an existing latch PUF.

The determination circuit 301 has a function that is similar to that of the determination circuit 301 of the latch PUF 300 illustrated in FIG. 3. When a signal having an L level is input to the determination circuit 301 after the metastable state occurs during the monitored predetermined clock periods, the determination circuit 301 outputs a "00" signal. In contrast, when a signal having an H level is input to the determination circuit 301 after the metastable state occurs during the monitored predetermined clock periods, the determination circuit 301 outputs a "11" signal. In contrast, when a random number is input to the determination circuit 301 during the monitored predetermined clock periods and if the random number contains many signals having an L level, the determination circuit 301 outputs a "01" signal. In contrast, when a random number is input to the determination circuit 301 during the monitored predetermined clock periods and if the random number contains many signals having an H level, the determination circuit 301 outputs a "10" signal.

Figure 9:
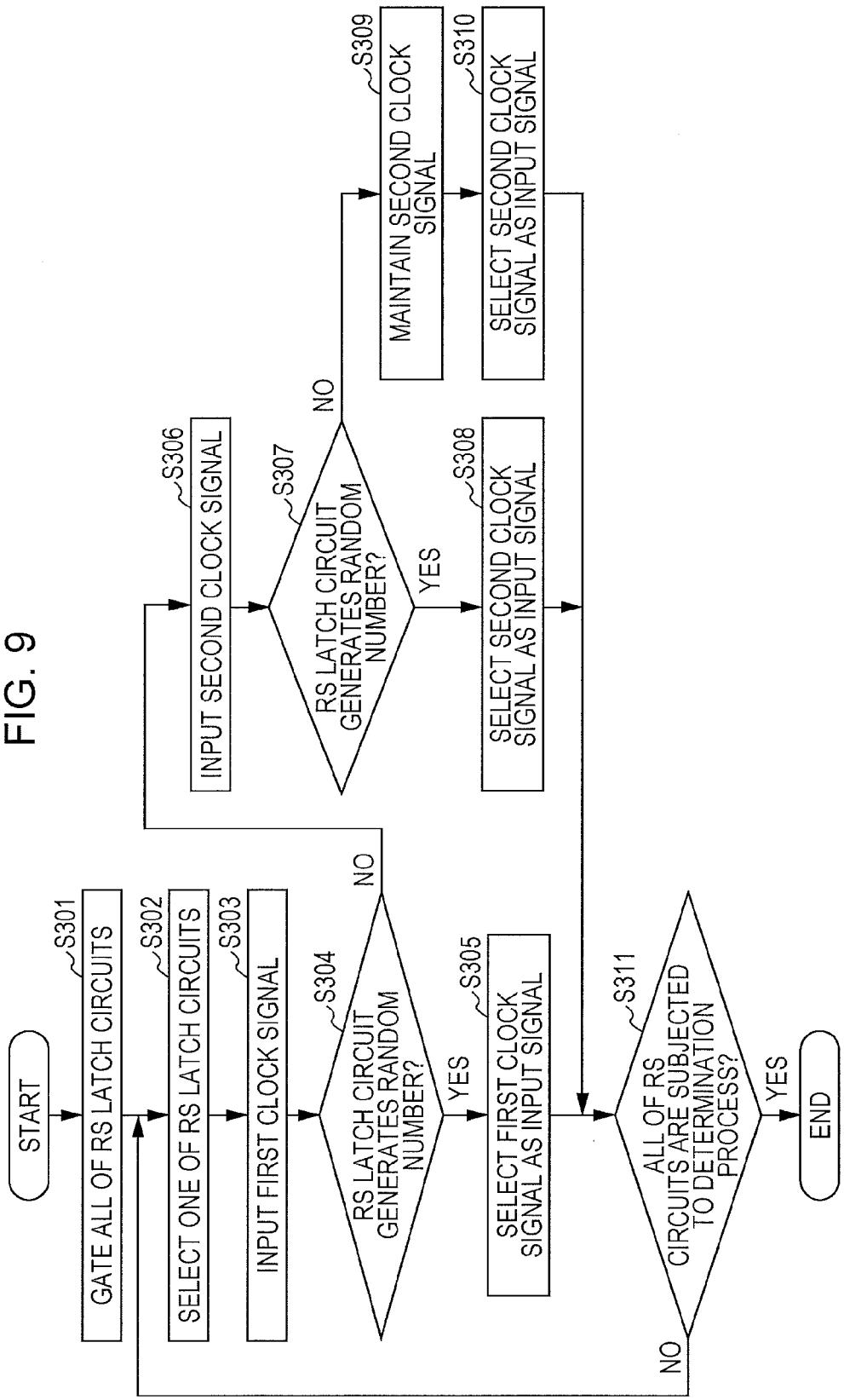
FIG. 9 is a flowchart of the processing performed by a latch PUF illustrated in FIG. 8.

FIG. 9 is a flowchart of the processing performed by the random number determination circuit 80.

In operations S301 to S308, the random number determination circuit 80 performs processes that are similar to those in operations S101 to S108 performed by the random number determination circuit 50, respectively.

Subsequently, in operation S309, the signal input to the RS latch circuit 10 is maintained as the second clock signal input to the second signal input terminal (1) of the selector 40-1. Thereafter, in operation S310, the random number determination circuit 80 selects the second clock signal as the input signal to be input to the RS latch circuit 10-1. Subsequently, the processing proceeds to operation S311, where the random number determination circuit 80 determines whether the determination process has been performed on all of the RS latch circuits 10-1 to 10-N. Thereafter, after operations S302 to S310 are sequentially performed for the RS latch circuits 10-2 to 10-N, the processing is completed.

When the processing performed by the random number determination circuit 80 is completed, the individual-specific information generator 90 acquires the outputs of the RS latch circuits 10-1 to 10-N. The individual-specific information generator 90 arranges the outputs of the determination circuits 301-1 to 301-N based on the order information defined in each of the determination circuits 301-1 to 301-N and generates the individual-specific information.

Figure 10:
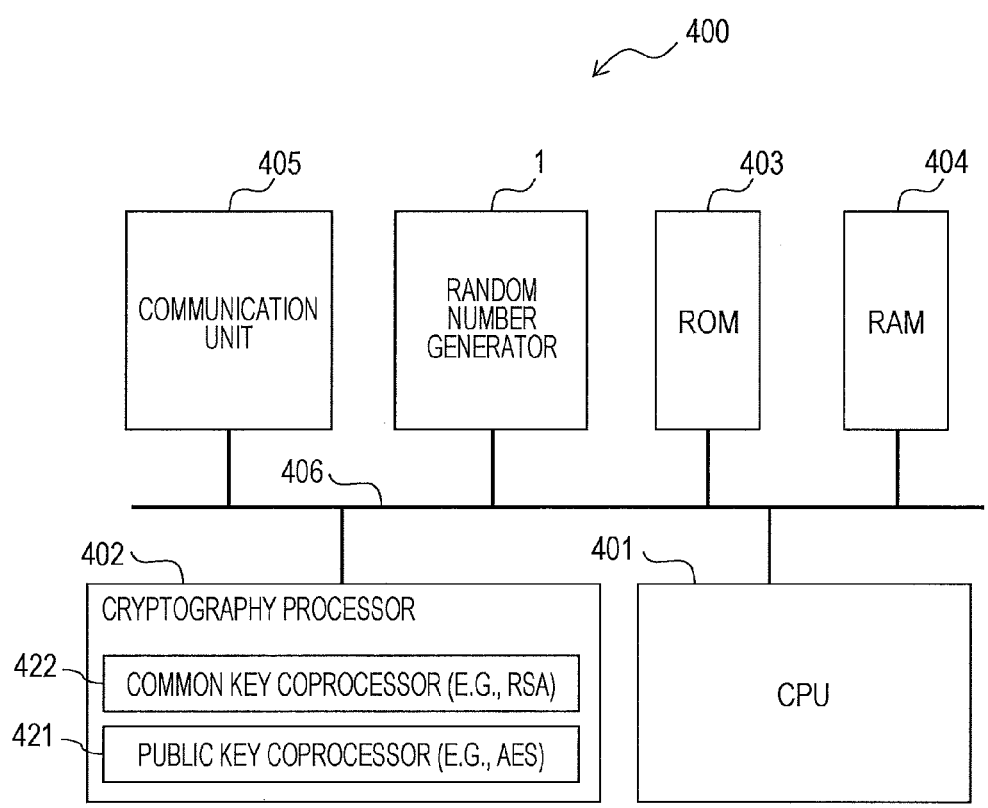
FIG. 10 is a circuit block diagram of an example of an electronic apparatus having the random number determination circuit illustrated in FIG. 4 mounted therein.

FIG. 10 is a circuit block diagram of an example of an electronic apparatus having the random number generator 1 mounted therein.

An electronic apparatus 400 includes the random number generator 1, an arithmetic processing unit 401, a cryptography processor 402, a read only memory (ROM) 403, a random access memory (RAM) 404, and a communication unit 405. The random number generator 1, the arithmetic processing unit 401, the cryptography processor 402, the ROM 403, the RAM 404, and the communication unit 405 are connected to one another via a bus 406.

The arithmetic processing unit 401 is also referred to as a "central processing unit (CPU) 401". The arithmetic processing unit 401 controls all of the elements of the electronic apparatus 400. The cryptography processor 402 includes a common key coprocessor 421 and a public key coprocessor 422. The cryptography processor 402 performs an encryption process on a variety of information items and performs a decryption process on encrypted data. The common key coprocessor 421 performs the encryption process and the decryption process using a common key cryptosystem, such as the data encryption standard (DES) and the advanced encryption standard (AES). The public key coprocessor 422 performs the encryption process and the decryption process using a public key cryptosystem, such as RSA, ElGamal, Rabin, and an elliptic curve cryptosystem.

The ROM 403 is a nonvolatile memory that stores a control program executed by the arithmetic processing unit 401 and a variety of parameters used by the cryptography processor 402 for the encryption process and decryption process. The RAM 404 is a volatile memory used as a work storage area by the arithmetic processing unit 401 and the cryptography processor 402 performing a variety of processes.

The communication unit 405 sends and receives encrypted signals indicating a variety of data to and from other electronic apparatuses (not illustrated). If the communication unit 405 receives an encrypted signal, the arithmetic processing unit 401 decrypts the received signal using the cryptography processor 402. In addition, the communication unit 405 sends a signal encrypted by the arithmetic processing unit 401 using the cryptography processor 402.

Figure 11:
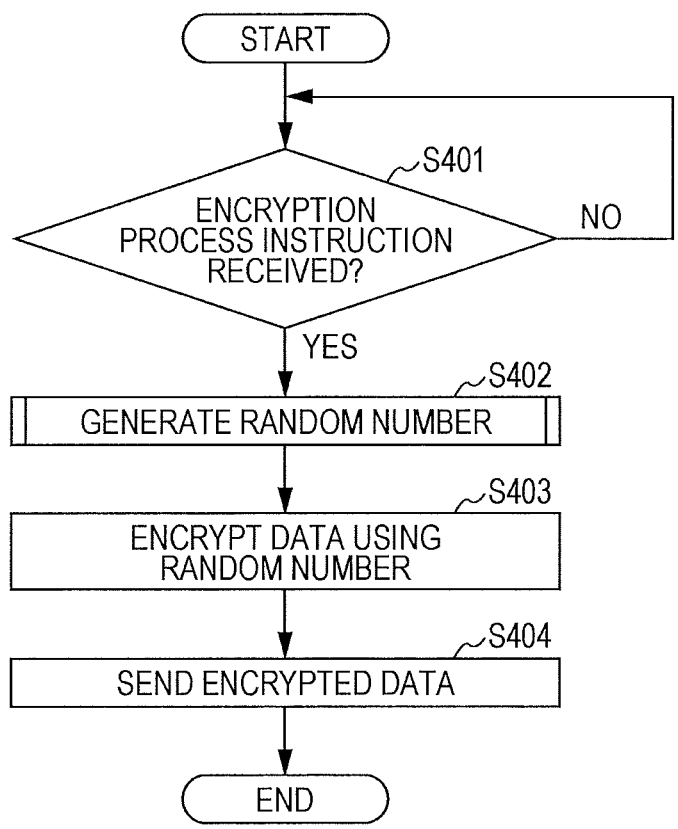
FIG. 11 is a flowchart of an encryption process performed by the electronic apparatus illustrated in FIG. 10.

FIG. 11 is a flowchart of the encryption process performed by the electronic apparatus 400.

In operation S401, the arithmetic processing unit 401 determines whether an instruction signal indicating an instruction to perform an encryption process has been received via the communication unit 405 first. If the arithmetic processing unit 401 determines that an instruction signal indicating an instruction to perform an encryption process has not been received, the processing returns to operation S401 after a predetermined period of time elapses. During the process in operation S401, the random number determination circuit 50 of the random number generator 1 inputs a signal having an L level to the input terminal 103 of each of the RS latch circuits 10-1 to 10-N to gate all the RS latch circuits 10-1 to 10-N. However, if the arithmetic processing unit 401 determines that an instruction signal indicating an instruction to perform an encryption process has been received, the processing proceeds to operation S402.

Subsequently, in operation S402, the arithmetic processing unit 401 generates a random number using the random number generator 1 and stores the generated random number in the RAM 404. The random number generator 1 performs the process illustrated in FIG. 5 to generate the random number. If the process to generate the random number by the random number generator 1 is completed, the arithmetic processing unit 401 instructs the random number determination circuit 50 of the random number generator 1 to gate all of the RS latch circuits 10-1 to 10-N of the random number generator 1.

Subsequently, in operation S403, the cryptography processor 402 of the arithmetic processing unit 401 encrypts data using the random number stored in the RAM 404 as an encryption key. The arithmetic processing unit 401 stores, in the RAM 404, the data encrypted by the cryptography processor 402. Thereafter, in operation S404, the arithmetic processing unit 401 sends the encrypted data stored in the RAM 404 via the communication unit 405.

Figure 12:
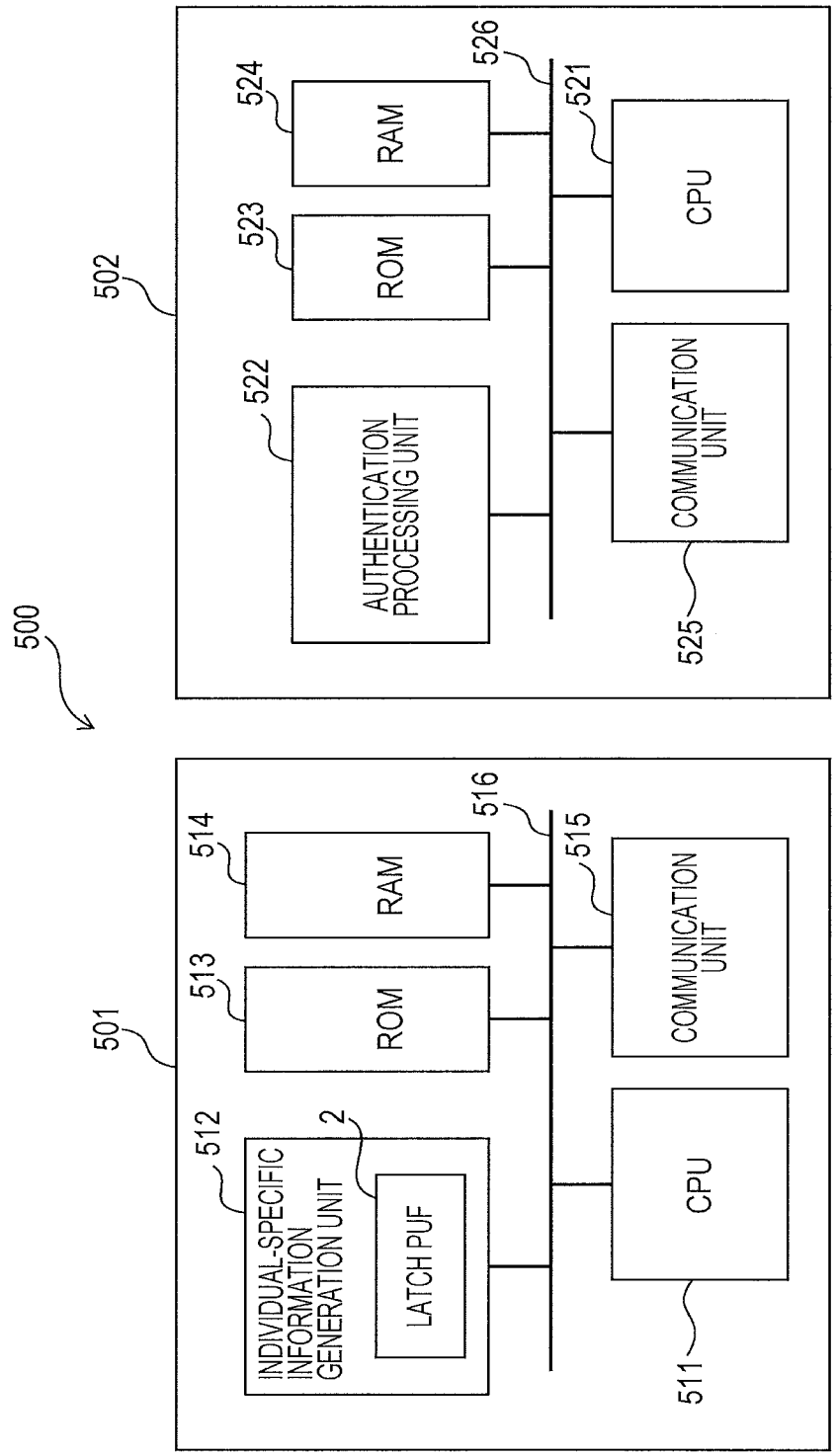
FIG. 12 is a circuit block diagram of an example of an authentication system including an electronic apparatus having the latch PUF illustrated in FIG. 6 mounted therein.

FIG. 12 is a circuit block diagram of an example of an authentication system that authenticates an electronic apparatus having the latch PUF 2 mounted therein.

An authentication system 500 includes an electronic apparatus 501 and an authentication apparatus 502.

The electronic apparatus 501 includes an arithmetic processing unit 511, an individual-specific information generation unit 512 including the latch PUF 2, a ROM 513, a RAM 514, and a communication unit 515. The arithmetic processing unit 511, the individual-specific information generation unit 512, the ROM 513, the RAM 514, and the communication unit 515 are connected to one another via a bus 516. The arithmetic processing unit 511, the ROM 513, the RAM 514, and the communication unit 515 have the same configurations as the arithmetic processing unit 401, the ROM 403, the RAM 404, and the communication unit 405 illustrated in FIG. 10, respectively. The individual-specific information generation unit 512 generates the individual-specific information regarding the electronic apparatus 501 by performing a variety of processes, such as error correction, on the individual-specific information generated by the latch PUF 2.

The authentication apparatus 502 includes an arithmetic processing unit 521, an authentication processing unit 522, a ROM 523 that stores the individual-specific information, a RAM 524, and a communication unit 525. The arithmetic processing unit 521, the authentication processing unit 522, the ROM 523, the RAM 524, and the communication unit 525 are connected to one another via a bus 526. In addition, the arithmetic processing unit 521, the ROM 523, the RAM 524, and the communication unit 525 have the same configurations as the arithmetic processing unit 401, the ROM 403, the RAM 404, and the communication unit 405 illustrated in FIG. 10, respectively. The authentication processing unit 522 compares the individual-specific information stored in the ROM 523 with the individual-specific information acquired from the electronic apparatus 501 via the communication unit 525. If the two individual-specific information items are the same, the authentication processing unit 522 generates match information.

Figure 13:
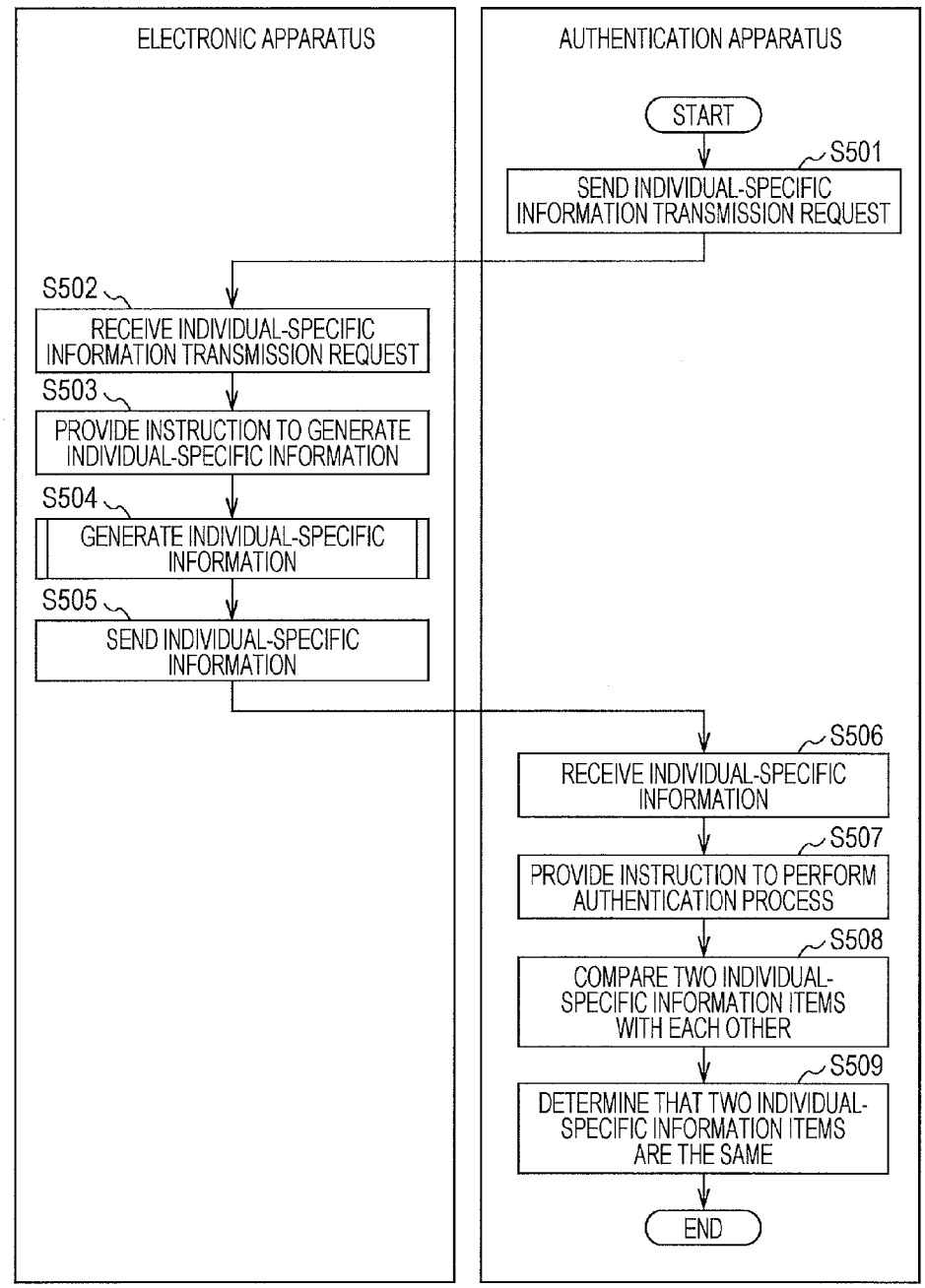
FIG. 13 is a flowchart of an authentication process performed by the authentication system illustrated in FIG. 12.

FIG. 13 is a flowchart of the authentication process performed by the authentication system 500.

In operations S501, the arithmetic processing unit 521 of the authentication apparatus 502 sends an individual-specific information transmission request to the electronic apparatus 501 via the communication unit 525. Thereafter, in operation S502, the arithmetic processing unit 511 of the electronic apparatus 501 receives the individual-specific information transmission request via the communication unit 515. In operation S503, the arithmetic processing unit 511 of the electronic apparatus 501 instructs the individual-specific information generation unit 512 to generate individual-specific information. Subsequently, in operation S504, the individual-specific information generation unit 512 generates the individual-specific information regarding the electronic apparatus 501 using the latch PUF 2 and stores the generated individual-specific information in the RAM 514. Note that the latch PUF 2 generates the individual-specific information by performing the process illustrated in FIG. 7. Subsequently, in operation S505, the arithmetic processing unit 511 of the electronic apparatus 501 sends, to the authentication apparatus 502, the individual-specific information stored in the RAM 514 via the communication unit 515.

Subsequently, in operation S506, the arithmetic processing unit 521 of the authentication apparatus 502 receives the individual-specific information via the communication unit 525 and stores the individual-specific information in the RAM 524. Thereafter, in operation S507, the arithmetic processing unit 521 of the authentication apparatus 502 instructs the authentication processing unit 522 to perform an authentication process. In operation S508, the authentication processing unit 522 compares the individual-specific information acquired from the electronic apparatus 501 and stored in the RAM 524 with the individual-specific information stored in the ROM 523 and determines whether the two individual-specific information items are the same. Subsequently, if, in operation S509, the two individual-specific information items are the same, the authentication processing unit 522 sends, to the arithmetic processing unit 521 of the authentication apparatus 502, information indicating that the two individual-specific information items are the same. Upon receiving the information indicating that the two individual-specific information items are the same from the authentication processing unit 522, the arithmetic processing unit 521 of the authentication apparatus 502 determines that the two individual-specific information items are the same.

Since the random number determination circuit 50 of the random number generator 1 determines whether the RS latch circuit 10 outputs a random number if the first clock signal and the second clock signal having a frequency that differs from the frequency of the first clock signal are input, the ratio of the number of the RS latch circuits that output a random number to the total number of the RS latch circuits increases. For example, in an existing random number generator, the number of the RS latch circuits that output a random number is 30 out of 256. In contrast, in the random number generator 1, the number of the RS latch circuits that output a random number is 51 out of 256.

In the random number generator 1, the ratio of the number of the RS latch circuits that output a random number to the total number of the RS latch circuits increases. Accordingly, the random number generator 1 may generate a random number having a quality that is higher than that generated by an existing random number generator including the same number of RS latch circuits as the random number generator 1. In addition, since the random number generator 1 generates a random number using a larger number of RS latch circuits than the existing random number generator, the quality of the random number negligibly decreases even when the temperature condition or the power supply voltage varies.

In addition, in the latch PUF 2, the random number determination circuit 70 determines whether the RS latch circuit 10 outputs a fixed number if the first clock signal and the second clock signal having a frequency that differs from the frequency of the first clock signal are input, the ratio of the number of the RS latch circuits that output a fixed number to the total number of the RS latch circuits increases. For example, in an existing latch PUF, the number of the RS latch circuits that output a fixed number is 210 out of 256. In contrast, in the latch PUF 2, the number of the RS latch circuits that output a fixed number is 231 out of 256.

In the latch PUF 2, the ratio of the number of the RS latch circuits that output a fixed number to the total number of the RS latch circuits increases. Accordingly, the latch PUF 2 may provide the number of patterns of the individual-specific information that is greater than that of an existing random number generator including the same number of RS latch circuits. Thus, the security may be increased. In the above-described example, the number of the patterns of the individual-specific information in the existing latch PUF is $2^{210}$. In contrast, the number of the patterns of the individual-specific information in the latch PUF 2 is increased to $2^{231}$.

In addition, in the latch PUF 3, by increasing the number of the RS latch circuit that outputs a random number, the ratio of the number of the RS latch circuits that output a random number to the total number of the RS latch circuits may be increased. Furthermore, in the latch PUF 3, whichever one of the first clock signal and the second clock signal is input, the random number determination circuit 80 maintains the state in which a random number is output from the output terminal of the RS latch circuit if it is determined that the RS latch circuit outputs the random number. The latch PUF 3 may generate the individual-specific information using all the RS latch circuits including the RS latch circuits that output a random number.

In the random number generator 1 and the latch PUFs 2 and 3, two clock signals, that is, the first clock signal and the second clock signal are input to the RS latch circuit. However, the latch PUF 3 may be configured so that one of three or more clock signals having different frequencies is selected. In the latch PUF 3 configured so that one of three or more clock signals is selected, when any one of the clock signals is input and if it is determined that the output of the RS latch circuit is a fixed number, any one of the selected clock signals may be selected. A clock signal having the lowest frequency may be preferably selected from among the selected clock signals.

In the latch PUF 3, when each of the first clock signal and the second clock signal is input and if it is determined that a fixed number is output, the random number determination circuit 80 fixes the signal output from the output terminal of the RS latch circuit to a fixed number. However, when each of the first clock signal and the second clock signal is input and if it is determined that a random number is output, the random number determination circuit 80 may maintain the state in which a random number is output from the output terminal of the RS latch circuit.

FIG. 14 is a flowchart of another example of the process performed by the random number determination circuit 80.

In operations S601 to S608, the random number determination circuit 80 performs the processes similar to those performed by the random number determination circuit 70 in operations S201 to S208 illustrated in FIG. 7, respectively.

Subsequently, in operation S609, the signal input to the RS latch circuit 10 is maintained as the second clock signal input to the second signal input terminal (1) of the selector 40-1. Thereafter, in operation S610, the random number determination circuit 80 selects the second clock signal as the input signal to be input to the RS latch circuit 10-1. Thereafter, the processing proceeds to operation S611, where the random number determination circuit 80 determines whether the determination process has been performed for all of the RS latch circuits 10-1 to 10-N. Subsequently, after the processes from operation S602 to S610 are sequentially performed for the RS latch circuits 10-2 to 10-N, the processing is completed.

In the example illustrated in FIG. 14, by increasing the number of the RS latch circuits that output a fixed number, the latch PUF 3 increases the ratio of the number of the RS latch circuits that output a fixed number to the total number of the RS latch circuits.

In addition, in the latch PUF 3, when a random number is input and if the input random number contains a large number of signals having an L level, the determination circuit 301 outputs the "01" signal. In contrast, if the input random number contains a large number of signals having an H level, the determination circuit 301 outputs the "10" signal. However, the determination circuit 301 may employ a different configuration. For example, if the input random number contains a large number of signals having an L level, the determination circuit 301 outputs the "10" signal. In contrast, if the input random number contains a large number of signals having an H level, the determination circuit 301 outputs the "01" signal. Alternatively, when a random number is input, the determination circuit 301 may output the "10" signal or the "01" signal regardless of the number of signals having an L level and the number of signals having an H level contained in the random number input during predetermined clock periods.

Furthermore, in the above-described embodiment, the electronic apparatus 400 performs an encryption process and a decryption process by using a random number generated by the random number generator 1 as the encryption key. However, the electronic apparatus 400 may have the latch PUF 2 or the latch PUF 3 mounted therein instead of the random number generator 1 and use the individual-specific information generated by the latch PUF 2 or the latch PUF 3 as the encryption key. Alternatively, individual-specific information generated by the latch PUF including a random number determination circuit that performs the process illustrated in FIG. 14 may be used as the encryption key.

Still furthermore, in the above-described embodiment, the authentication system 500 performs an authentication process using the individual-specific information generated by the latch PUF 2. However, the electronic apparatus 501 may have the latch PUF 3 mounted therein instead of the latch PUF 2 and perform the authentication process using individual-specific information generated by the latch PUF 3. Alternatively, the authentication system 500 may perform the authentication process using individual-specific information generated by the latch PUF including a random number determination circuit that performs the process illustrated in FIG. 14.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An electronic circuit comprising:
a plurality of RS latch circuits each configured to enter a metastable state in accordance with a clock signal input to the RS latch circuit;
a determination circuit configured to determine whether an output of each of the RS latch circuits is a random number or a fixed number; and
a selector configured to select whether to maintain the clock signal input to the RS latch circuit, to change the clock signal input to the RS latch circuit to another clock signal having a different frequency, or to input a clock signal for fixing a signal output from the RS latch circuit, as the clock signal input to the RS latch circuit, in accordance with a result determined by the determination circuit.

2. The electronic circuit according to claim 1, wherein
the selector maintains the clock signal input to the RS latch circuit if it is determined that the output of the RS latch circuit is a random number,
the selector changes the clock signal input to the RS latch circuit to another clock signal having a different frequency if it is determined that the output of the RS latch circuit is a fixed number, and
the selector inputs a signal for fixing a signal output from the RS latch circuit if it is determined that the output of the RS latch circuit is a fixed number even when any clock signal having a different frequency is input.

3. The electronic circuit according to claim 1, wherein
the selector maintains the clock signal input to the RS latch circuit if it is determined that the output of the RS latch circuit is a fixed number,
the selector changes the clock signal input to the RS latch circuit to another clock signal having a different frequency if it is determined that the output of the RS latch circuit is a random number, and
the selector inputs a signal for fixing a signal output from the RS latch circuit if it is determined that the output of the RS latch circuit is a random number even when any clock signal having a different frequency is input.

4. The electronic circuit according to claim 1, wherein
the selector maintains the clock signal input to the RS latch circuit if it is determined that the output of the RS latch circuit is a random number,
the selector changes the clock signal input to the RS latch circuit to another clock signal having a different frequency if it is determined that the output of the RS latch circuit is a fixed number, and
the selector selects one of clock signals having different frequencies as an input signal if it is determined that the output of the RS latch circuit is a fixed number even when any clock signal having a different frequency is input.

5. The electronic circuit according to claim 1, wherein
the selector maintains the clock signal input to the RS latch circuit if it is determined that the output of the RS latch circuit is a fixed number,
the selector changes the clock signal input to the RS latch circuit to another clock signal having a different frequency if it is determined that the output of the RS latch circuit is a random number, and
the selector selects one of clock signals having different frequencies as an input signal if it is determined that the output of the RS latch circuit is a random number even when any clock signal having a different frequency is input.

6. An electronic apparatus comprising:
a random number generator configured to include
a plurality of RS latch circuits each configured to enter a metastable state in accordance with a clock signal input to the RS latch circuit,
a determination circuit configured to determine whether an output of each of the RS latch circuits is a random number or a fixed number,
a selector configured to
maintain the clock signal input to the RS latch circuit if it is determined that the output of the RS latch circuit is a random number,
change the clock signal input to the RS latch circuit to another clock signal having a different frequency if it is determined that the output of the RS latch circuit is a fixed number, and
input a signal for fixing a signal output from the RS latch circuit if it is determined that the output of the RS latch circuit is a fixed number even when any clock signal having a different frequency is input, and
an exclusive OR circuit configured to calculate an exclusive OR of outputs of the RS latch circuits; and
a cryptography processor configured to perform an encryption process and a decryption process by using a random number generated by the random number generator as an encryption key.

7. An electronic apparatus comprising:
a plurality of RS latch circuits each configured to enter a metastable state in accordance with a clock signal input to the RS latch circuit;
a determination circuit configured to determine whether an output of each of the RS latch circuits is a random number or a fixed number;
a selector configured to
maintain the clock signal input to the RS latch circuit if it is determined that the output of the RS latch circuit is a fixed number,
change the clock signal input to the RS latch circuit to another clock signal having a different frequency if it is determined that the output of the RS latch circuit is a random number, and
input a signal for fixing a signal output from the RS latch circuit if it is determined that the output of the RS latch circuit is a random number even when any clock signal having a different frequency is input;

an individual-specific information generation unit configured to generate an individual-specific information using outputs of the plurality of RS latch circuits; and a cryptography processor configured to perform an encryption process and a decryption process by using the individual-specific information generated by the individual-specific information generation unit as an encryption key.

8. The electronic apparatus according to claim 7, wherein the selector maintains the clock signal input to the RS latch circuit if it is determined that the output of the RS latch circuit is a random number, the selector changes the clock signal input to the RS latch circuit to another clock signal having a different frequency if it is determined that the output of the RS latch circuit is a fixed number, and the selector selects one of clock signals having different frequencies as an input signal if it is determined that the output of the RS latch circuit is a fixed number even when any clock signal having a different frequency is input.

9. The electronic apparatus according to claim 7, wherein the selector maintains the clock signal input to the RS latch circuit if it is determined that the output of the RS latch circuit is a fixed number, the selector changes the clock signal input to the RS latch circuit to another clock signal having a different frequency if it is determined that the output of the RS latch circuit is a random number, and the selector selects one of clock signals having different frequencies as an input signal if it is determined that the output of the RS latch circuit is a random number even when any clock signal having a different frequency is input.

10. An authentication system comprising:

an electronic apparatus configured to include a plurality of RS latch circuits each configured to enter a metastable state in accordance with a clock signal input to the RS latch circuit, a determination circuit configured to determine whether an output of each of the RS latch circuits is a random number or a fixed number, a selector configured to maintain the clock signal input to the RS latch circuit if it is determined that the output of the RS latch circuit is a fixed number, change the clock signal input to the RS latch circuit to another clock signal having a different frequency if it is determined that the output of the RS latch circuit is a random number, and input a signal for fixing a signal output from the RS latch circuit if it is determined that the output of the RS latch circuit is a random number even when any clock signal having a different frequency is input, an individual-specific information generation unit configured to generate an individual-specific information using outputs of the plurality of RS latch circuits, and a communication unit configured to send the individual-specific information generated by the individual-specific information generation unit; and an authentication apparatus configured to authenticate the individual-specific information sent form the electronic apparatus.

11. The authentication system according to claim 10, wherein the selector maintains the clock signal input to the RS latch circuit if it is determined that the output of the RS latch circuit is a random number, the selector changes the clock signal input to the RS latch circuit to another clock signal having a different frequency if it is determined that the output of the RS latch circuit is a fixed number, and the selector selects one of clock signals having different frequencies as an input signal if it is determined that the output of the RS latch circuit is a fixed number even when any clock signal having a different frequency is input.

12. The authentication system according to claim 10, wherein the selector maintains the clock signal input to the RS latch circuit if it is determined that the output of the RS latch circuit is a fixed number, the selector changes the clock signal input to the RS latch circuit to another clock signal having a different frequency if it is determined that the output of the RS latch circuit is a random number, and the selector selects one of clock signals having different frequencies as an input signal if it is determined that the output of the RS latch circuit is a random number even when any clock signal having a different frequency is input.

* * * * *